United States Patent [19]

Schwenninger et al.

[11] 4,114,444
[45] Sep. 19, 1978

[54] MEASURING GLASS SURFACE TEMPERATURE DURING ANNEALING

[75] Inventors: Ernest N. Schwenninger; Ronald L. Schwenninger, both of Cumberland, Md.

[73] Assignee: PPG Industries, Inc., Pittsburgh, Pa.

[21] Appl. No.: 757,122

[22] Filed: Jan. 5, 1977

[51] Int. Cl.$^2$ .............................................. G01K 7/02
[52] U.S. Cl. .................................... 73/359 R; 136/233
[58] Field of Search .................. 73/351, 359 R, 359 A; 136/233

[56] References Cited

U.S. PATENT DOCUMENTS

| | | | |
|---|---|---|---|
| 3,006,978 | 10/1961 | McGrath et al. | 136/233 X |
| 3,241,370 | 3/1966 | Mertler et al. | 73/352 |
| 3,305,405 | 2/1967 | Jamieson | 136/233 X |
| 3,398,580 | 8/1968 | Nyman et al. | 73/359 |
| 3,875,799 | 4/1975 | Webster | 73/359 X |
| 3,957,475 | 5/1976 | Schwenninger et al. | 73/351 X |

OTHER PUBLICATIONS

Niedenzu, V. and J. W. Dawson; *Boron–Nitrogen Compounds;* New York; Academic Press, Inc.; 1965, pp 152–153.

*Primary Examiner*—Charles Gorenstein
*Attorney, Agent, or Firm*—Edward I. Mates

[57] ABSTRACT

Method and apparatus for continuously monitoring the surface temperature of a glass ribbon moving through a critical portion of an annealing lehr where the rate of cooling determines whether the ribbon may be cut easily after annealing and whether the ribbon is subjected to spontaneous breakage during annealing. The temperature sensing means comprises a thermocouple junction embedded within a boron nitride plug a predetermined distance from the surface of the plug that slides in contact with a surface of the moving glass ribbon in the main portion of the ribbon that is cut into blanks of commercially acceptable glass of acceptable optical quality.

5 Claims, 2 Drawing Figures

MEASURING GLASS SURFACE TEMPERATURE DURING ANNEALING

BACKGROUND OF THE INVENTION

The present invention relates to the annealing of a newly formed glass ribbon and particularly relates to a method and apparatus for sensing the temperature at a critical portion of the cooling cycle at which the ease of cutting the ribbon and the likelihood of glass breakage is determined. The present invention is particularly useful to monitor the temperature of a moving ribbon of float glass in the region or main portion of the ribbon that is usually cut into rectangular or square blanks of commercially acceptable glass from the ribbon.

In the past, glass surface temperature measurements during annealing have been performed by thermocouples or temperature sensing elements spaced from the glass surface. Using temperature sensing elements spaced from the glass surface avoided scratching of the glass surfaces. However, other problems such as the sensing of extraneous radiation not associated with the temperature of the glass being monitored tended to cause errors in the sensed temperature.

Typical examples of patents providing non-contacting temperature sensing devices for moving glass ribbons are U.S. Pat. No. 2,912,862 to Machler et al and U.S. Pat. No. 3,600,947 to Farabaugh.

U.S. Pat. No. 3,500,548 to Mitsuno discloses the use of a pair of graphite electrodes positioned with a ribbon forming apparatus and adapted to contact the edge portion of a newly formed ribbon for the purpose of determining the presence or absence of the edge at an inspection station in a method of detecting and measuring the width of the ribbon as it passes the detection station. When the ribbon is narrower than the range of width to be detected, the electrodes do not contact any glass ribbon. When the ribbon width is greater, an edge portion of the ribbon is in contact with one or both of the electrodes mounted for contact by the ribbon edge portion. However, the edge detection apparatus of the Mitsuno patent is not used for determination of temperature of the ribbon.

U.S. Pat. No. 3,957,475 to Schwenninger and Welton involves determining the temperature of the ribbon along a line of movement at a given distance transversely inward from the edge of the ribbon when the ribbon is cooling through a critical range of temperatures. The line of movement is laterally outside a line along which the ribbon is to be cut along its length after the ribbon is annealed and usually represents a portion of the ribbon that would otherwise be unused, except perhaps as cullet, particularly when the ribbon is of float glass which usually has edge portions of inferior optical quality. The latter patent provides a particular apparatus to insure that the line along which the temperature is sensed is a desired distance from the glass edge and that the temperature sensing element is in heat conductive relation with the surface of the ribbon along the line of temperature measurement.

If the surface temperature of the glass ribbon along its edge portions is properly controlled, the ribbon can be subsequently cut easily, particularly along a line extending longitudinally of the ribbon path through the annealing lehr. Furthermore, controlling the rate at which the glass ribbon cools through the critical range of temperatures is a factor in controlling spontaneous breakage or splitting of the ribbon both longitudinally and laterally of its path of movement through the annealing lehr.

The Schwenninger and Welton patent uses glass temperture sensing means in heat conducting relation to the ribbon through heat conducting elements that contact the moving glass ribbon along a portion of said ribbon that would be wasted anyway without causing damage to the optical properties of the glass sheets that are subsequently cut away from the ribbon, a factor that discouraged the use of glass contacting temperature sensing means in the past.

The Schwenninger and Welton patent provides means for detecting the temperature of the glass ribbon at a fixed distance adjacent each of the opposite longitudinal side edges thereof in the region where the ribbon cools through a critical temperature zone. The apparatus disclosed therein provides temperature sensing means disposed in heat-conducting relation with a surface of the ribbon and is supported by means that is in slidable relation with the ribbon surface. While such sliding relation has been avoided in the past, the Schwenninger and Welton patent involves making such sliding contact along the edge portions of the ribbon that must be trimmed anyway, so that any surface marking resulting from such sliding contact does not harm the usable portion of the ribbon, yet the accurate temperature readings obtained can be correlated with the cooling rate of the usable portion of the ribbon.

The inventions disclosed in the prior art, despite the ability to avoid marring of the pristine surface of a newly formed glass ribbon has limited operators to either try to infer and control glass temperatures from data obtained from a combination of ambient air temperatures (via thermocouples above the glass), and tunnel temperatures (also via thermocouples), or measuring actual glass temperatures in regions other than the critical regions where it is necessary to know the exact glass temperatures with optical radiation pyrometers.

The first technique, using ambient and tunnel temperatures, provides at best only relative information concerning glass temperatures. With annealing dependent on such things as viscosity, which in turn relates to absolute temperatures in an exponential fashion, relative temperature measurements are less than ideal. Previously, temperatures at critical locations have been estimated by developing empirical relationships that define energy distribution, cooling air flows, etc., in terms of various parameters such as ribbon speeds, thickness, etc. This is a complex and cumbersome procedure that, at best, has uncontrolled parameters introducing variations in the annealing process that often go undetected until manifest in the finished product as undesirable stress profiles, poor cutting, or worse, cross breaks or splits. These in turn dictate another round of empirical adjustments that are time consuming to develop and still lack accuracy because they cannot possibly be adjusted promptly in response to changes in parameters of lehr atmosphere and glass characteristics that dictate such adjustments.

The development of sensitive optical radiation pyrometers was heralded a few years ago as the solution to the aforesaid annealing woes. Much time and effort have gone into programs at float glass production units to make them a viable tool. After working with them for several years, further improvements in accuracy of temperature measurements were still needed. At glass-annealing temperatures, with the necessary optical filtering, the output is so small that signal resolution and signal-to-noise ratios become major problems. Furthermore, in spite of the best efforts to control the annealing process based on temperature determinations, intolerable problems were met with signals signifying glass temperature drifting to such an extent that it was difficult, if not impossible, to determine absolute glass temperatures by the empirical methods developed in the prior art.

SUMMARY OF THE INVENTION

The invention disclosed herein solves the problems mentioned by providing a temperature sensing means that gives precise relative glass temperatures, that are only slightly less precise than absolute values.

The means comprises a thermocouple junction embedded in a plug of boron nitride that contacts the glass sheet in the main portion of the ribbon that is usually cut into blanks of commercially acceptable glass of acceptable optical quality. The boron nitride tip is a cylindrical section with its contact face trimmed at an oblique angle. The boron nitride provides a lubricating thermal coupling providing a predetermined spacing between the glass ribbon and the thermocouple junction that can withstand the annealing temperatures in an oxidizing environment while not marking or marring the glass, even when the glass ribbon main portion that is contacted is ultimately used for the critical silvering market. The tip and junction assembly are supported by a hollow cylindrical stainless steel tube to form a lower arm.

The lower arm is supported by an upper arm (a larger diameter stainless steel pipe) via a pivotal connection. The elevation of the upper arm is adjusted vertically in such a manner that the lower arm drags downstream at such an angle that the contact face of the boron nitride tip is parallel and flush with the upper surface of the ribbon. The jointed arm concept provides a controlled uniform pressure at the boron nitride-glass interface, while providing an automatic means for moving out of the way if breakage or some other sort of interference moves through the lehr.

A matrix of temperature sensing means provides a temperature pattern along the length and across the width of a critical portion of the annealing lehr where control of the glass cooling rate is most critical.

BRIEF DESCRIPTION OF THE DRAWINGS

The present invention will be understood more clearly in the light of a description of a specific embodiment which follows.

In the drawings which form part of the description of the illustrative preferred embodiment and wherein like reference numbers refer to like structural elements.

DESCRIPTION OF THE PREFERRED EMBODIMENT

Figure 1:
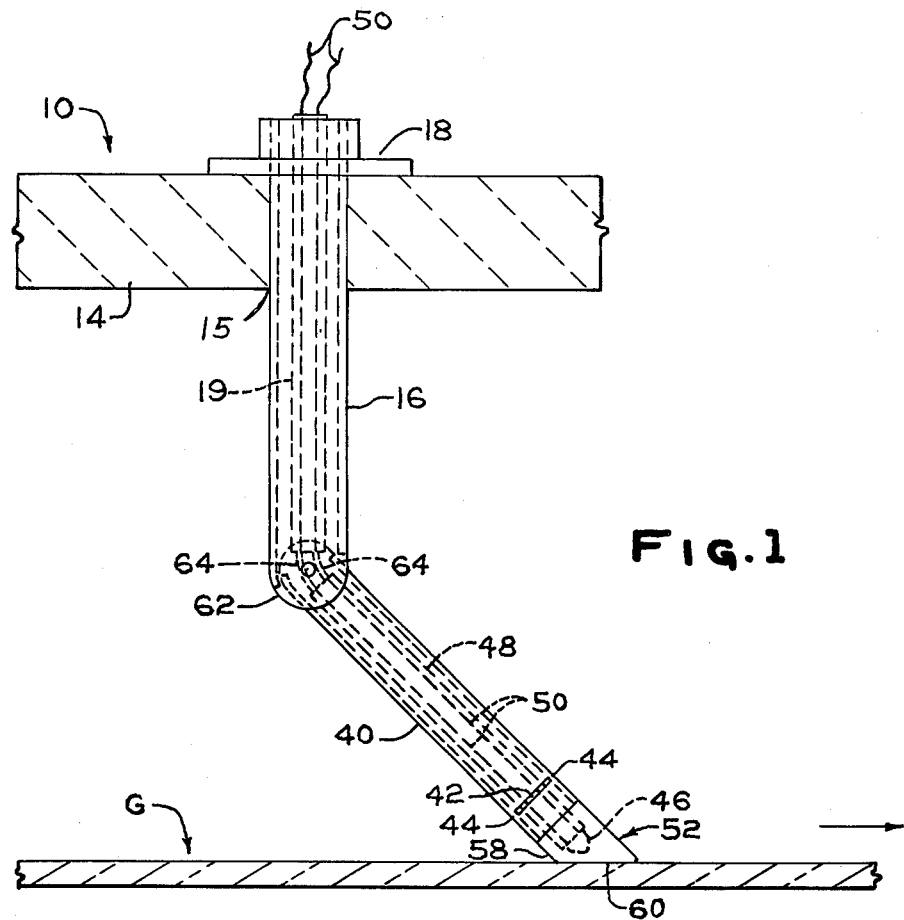
FIG. 1 is a fragmentary sectional view of a portion of an annealing lehr showing an end view of a glass temperature sensing means according to an illustrative embodiment of the present invention.
Figure 2:
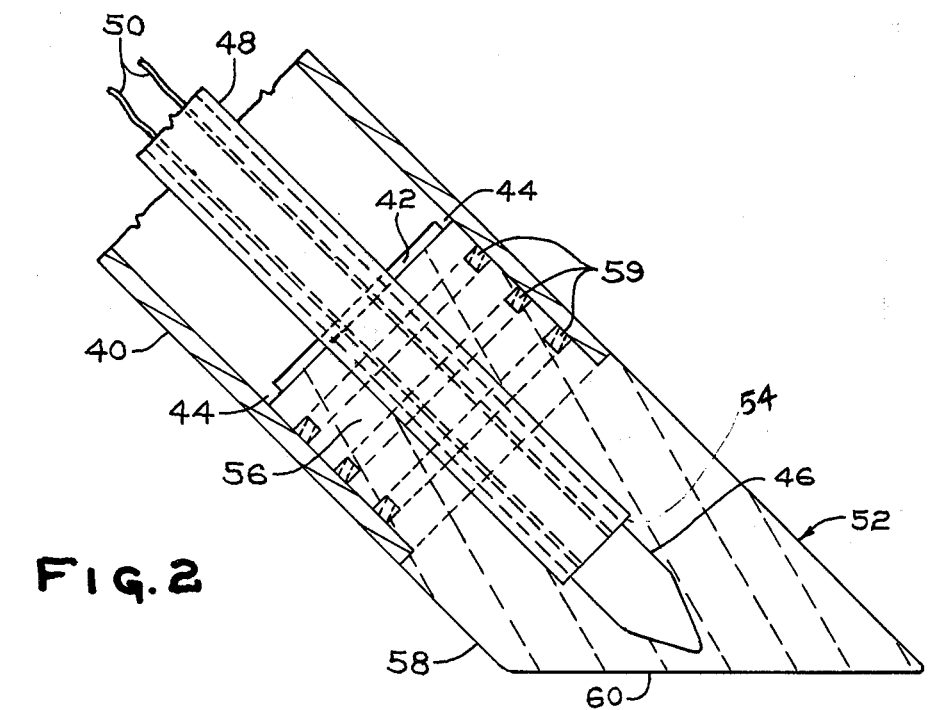
FIG. 2 is an enlarged sectional view of an end portion of tube means supporting a glass temperature sensing means according to the illustrative embodiment of the present invention.

Referring to the drawings, a portion of an annealing lehr 10 is shown comprising a horizontal roof 14 having a roof opening 15 that receives a vertical pipe 16 whose vertical position is fixed by a set screw 18. The pipe 16 carries a double bored porcelain sheath 19 concentric therewith. The lower end of the vertical pipe communicates with a diagonally and obliquely downwardly extending tube 40 extending at an angle with respect to the vertical pipe 16. Both the pipe 16 and the tube 40 are preferably composed of stainless steel. The tube 40 is provided with a pair of slots 42 that extend partly around the circumference of the tube 40 leaving a pair of diametrically opposed connecting elements 44 disposed in alignment with one another in the direction of movement of a glass ribbon G in the lehr 10.

A thermocouple junction 46 which is preferably of chromel-alumel alloy and which forms the critical element of a temperature sensing means extends beyond the lower end of a thermocouple sheath 48 carried by the tube 40. The thermocouple sheath 48 is preferably a double bored procelain member spaced from the inner wall of the stainless steel tube 40 and concentric therewith. Thermocouple wires 50 are connected at their lower ends to the thermocouple junction 46. A plug 52 of boron nitride is partially inserted within the lower end of the stainless steel tube 40 to form a tip having a recess 54 that receives the lower end of the thermocouple sheath 48 and its exposed thermocouple junction 46.

The boron nitride plug 52 is of generally cylindrical configuration having an upper cylindrical portion 56 that fits snugly within the lower portion of the stainless steel tube 40 and a lower portion 58 of a slightly larger radius that forms a lower continuation of the upper cylindrical portion 56 and whose upper portion abuts against the lower end of the stainless steel tube 40 to insure proper positioning of the boron nitride plug 52 within the stainless steel tube 40. The upper portion 56 is provided with a plurality of spaced, parallel, circumferential grooves, each groove holding a ceramic cement filler 59 to key the boron nitride plug 52 to the tube 40. A suitable ceramic cement for this purpose is sold under the trademark Insa-Lute adhesive cement #1 paste by Sauereisen Cement Co. of Pittsburgh, Pa.

The bottom surface 60 of the boron nitride plug 52 extends diagonally with respect to the axis common to the stainless steel tube 40 and the plug 52 and the upper end of tube 40 is pivotally connected to the lower end of vertical pipe 16 to form a pivotal connection or elbow joint 62 so that the bottom surface of plug 52 can be oriented parallel to and flush with the upper horizontal surface of a glass ribbon G moving in the direction of the arrow from left to right of FIG. 1. The position of the vertical pipe 16 is coordinated with the pivoting of the tube 40 relative thereto to insure this flush surface to surface contact between surface 60 of the boron nitride plug 52 and the glass ribbon G in the main portion of the ribbon that is subsequently cut into blanks of commercially acceptable glass.

In order to provide a light downward force to insure that the bottom surface 60 of the boron nitride plug 52 makes adequate heat-exchanging contact with the upper surface of the moving glass ribbon G but not so much force as to mark the surface, the stainless steel tube 40 and the elements connected thereto and carried thereby are made of such a weight as to impart a downward force of a few grams only against the upper surface of the glass ribbon. It is understood, however, that the plug 52 can be mounted for sliding engagement against the lower surface of the ribbon, if such is desired, by applying a counterweight to bias the tube 40 to pivot 52 upward about pivotal connection 62 relative to vertical pipe 16, and mounting the latter through the floor rather than the roof of lehr 10.

Each thermocouple wire 50 extends continuously through one or the other bores of the thermocouple sheath, through one of the flexible connecting sleeves 64, through one or the other bores of the sheath 19 and 48, through the opening 15 in the lehr roof 14 without making contact with either the vertical pipe 16 or the stainless steel tube 40. In order to accommodate some pivoting, a short, flexible connecting sleeve 64 of asbestos or fiber glass, preferably braided sleeving, covers each of the wires 50 in the vicinity of the pivotal connection 62 between the lower end of the sheath 19 and the upper end of the thermocouple sheath 48.

The recess 54 in the boron nitride plug 52 is so constructed and arranged that the chromel-alumel junction 46 is approximately 3 millimeters from contact with the glass surface with the lower portion of the plug 52 providing the spacing between the upper surface of the glass ribbon G and the thermocouple junction 46. This enables the thermocouple junction 46 to deliver an output current that is correlated with the temperature of the glass surface contacted.

The pair of slots 42 perpendicular to the long axis of the stainless steel tube just above the boron nitride plug provides thermal isolation to minimize ambient air temperature influences on the thermocouple junction 46 via the remainder of the stainless steel tube 40. This isolation from ambient influences can be further enhanced by insulating the lower part of the tube, as well as all but the last fraction of an inch of the boron nitride tip, with a thermally insulating material such as a cermaic fiber and thermal insulation material of alumino-silica composition sold by Carborundum as Fiberfrax paper.

The connecting elements 44 that remain after the slots 42 are formed by cutting tube 40 are located in positions aligned with the axis of movement for the glass ribbon G through the lehr 10 and diametrically opposite one another. The tube 40 is structurally strong in the direction of ribbon movement. Therefore, it can readily pivot upward without breaking should the ribbon carry particles of glass fragments or other materials that would engage the plug 52 as the ribbon moves past the station occupied by the temperature sensing means.

While the illustrative embodiment described herein shows a single temperature sensing means disposed in the critical portion of the path taken by the glass ribbon through the annealing lehr, it is understood that fewer or more temperature sensing means may be provided as required and may be used wherever desired in conjunction with a lehr for thermally treating a glass ribbon. In a particular embodiment of annealing lehr 10, sensing elements have been used in the critical portion of an annealing lehr, arranged in a matrix of 12 rows of five sensing elements each. Furthermore, it is understood that while the apparatus shows the use of thermocouples in heat conducting relation with the upper surface of the ribbon, it is also possible to rearrange the apparatus so that the lower surface of the ribbon is slidably contacted by the upper end of a plug in which a thermocouple junction is embedded and have the temperature of the glass ribbon monitored continuously at its lower surface.

The matrix of temperature sensing means is preferably arranged within the lehr in a checkerboard pattern with transverse rows of transversely spaced temperature sensing means spaced longitudinally of one another in the critical portion of the annealing lehr 10. For float glass of soda-lime-silica composition, this critical portion of the lehr is where the temperature of the glass ribbon is controlled to be within an approximate temperature range of between 540° and 430° C. For other glass compositions having different strain temperatures and annealing temperatures, the temperature sensing means are disposed in a critical portion having different temperature ranges suitable for the composition of the glass being produced.

The form of the invention shown and described herein represents an illustrative preferred embodiment. It is understood that various changes may be made without departing from the gist of the invention as defined in the claimed subject matter which follows.

We claim:

1. Apparatus for determining the temperature at a fixed position within a glass annealing lehr of a main portion of a moving glass ribbon to be cut into blanks of commercially acceptable glass having acceptable optical properties, when said portion passes said fixed position, comprising a temperature sensing element, a plug of boron nitride of generally cylindrical configuration having a lower portion including a surface adapted for sliding contact with said moving glass ribbon at said fixed position, a recess spaced a predetermined distance substantially greater than four microns from said exposed surface of said plug, and an upper portion, a temperature sensing element carried by said plug within said recess, said temperature sensing element comprising wires that spoil the optical properties of a moving glass ribbon on relative sliding contact therewith, said plug of boron nitride providing a thermal conductive path from the contacted surface of the moving glass ribbon to said temperature sensing element while providing electrical insulation between the temperature sensing element and the glass surface and protection for the ribbon from sliding contact with said wires of said temperature sensing element, and tube means surrounding said upper portion of said plug, said lower portion of said plug having a slightly larger radius than its said upper portion, whereby said exposed surface of said plug is the only portion of said apparatus adapted to make sliding contact with said main portion of said moving glass ribbon.

2. Apparatus as in claim 1, wherein said tube means is composed of stainless steel that harms glass on making sliding contact therewith.

3. Apparatus as in claim 1, further including means for supporting said tube means comprising a vertical pipe, means for adjusting the vertical position of said vertical pipe, and pivot means making an elbow connection between said tube means and said vertical pipe, said plug having approximately the shape of a cylinder and said exposed surface extending obliquely of the axis of said cylinder to make flush surface to surface contact with successive elements of said main portion of said main glass ribbon.

4. Apparatus as in claim 1 wherein said recess containing said temperature sensing element is spaced from said exposed surface of said boron nitride plug by a distance on the order of three millimeters.

5. Apparatus as in claim 1 further including thermal insulation means to isolate said boron nitride plug from ambient thermal influences other than those provided by said moving glass ribbon, said thermal insulation means enclosing all but a fraction of an inch of the boron nitride plug adjacent its glass ribbon contacting surface.

* * * * *

UNITED STATES PATENT AND TRADEMARK OFFICE
CERTIFICATE OF CORRECTION

PATENT NO. : 4,114,444
DATED : September 19, 1978
INVENTOR(S) : Ernest N. Schwenninger and Ronald L. Schwenninger It is certified that error appears in the above-identified patent and that said Letters Patent are hereby corrected as shown below:

Column 1, line 30, "with" should be --within--.

Signed and Sealed this

Thirteenth Day of March 1979

[SEAL]

Attest:

RUTH C. MASON
Attesting Officer

DONALD W. BANNER
Commissioner of Patents and Trademarks